United States Patent
Boldi et al.

(10) Patent No.: US 9,986,549 B2
(45) Date of Patent: May 29, 2018

(54) METHOD FOR DYNAMICALLY REDUCING FRONTHAUL LOAD BETWEEN A BASE STATION AND MULTIPLE REMOTE RADIO UNITS

(71) Applicant: Telecom Italia S.p.A., Milan (IT)

(72) Inventors: Mauro Boldi, Turin (IT); Paolo Gianola, Turin (IT); Bruno Melis, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days. days.

(21) Appl. No.: 15/321,590

(22) PCT Filed: Jun. 23, 2014

(86) PCT No.: PCT/EP2014/063134
§ 371 (c)(1),
(2) Date: Dec. 22, 2016

(87) PCT Pub. No.: WO2015/197101
PCT Pub. Date: Dec. 30, 2015

(65) Prior Publication Data
US 2017/0164336 A1   Jun. 8, 2017

(51) Int. Cl.
*H04B 7/00* (2006.01)
*H04W 72/04* (2009.01)
(Continued)

(52) U.S. Cl.
CPC .... *H04W 72/042* (2013.01); *H04B 10/25758* (2013.01); *H04W 72/0453* (2013.01); *H04W 72/0486* (2013.01); *H04W 88/085* (2013.01)

(58) Field of Classification Search
USPC .......................................... 455/507, 450–455
See application file for complete search history.

(56) References Cited

U.S. PATENT DOCUMENTS

2011/0171944 A1*  7/2011  Kobayashi .......... H04W 88/085
                                                              455/418
2012/0314665 A1* 12/2012  Ishida .................... H01Q 21/28
                                                              370/329
(Continued)

FOREIGN PATENT DOCUMENTS

| WO | 2006/102919 A1 | 10/2006 |
| WO | 2010/075864 A1 | 7/2010 |
| WO | 2013/082734 A1 | 6/2013 |

OTHER PUBLICATIONS

Mar. 4, 2015—(WO) ISR and Written Opinion of the ISA—App PCT/EP2014/063134.

(Continued)

*Primary Examiner* — Fayyaz Alam
(74) *Attorney, Agent, or Firm* — Banner & Witcoff, Ltd.

(57) ABSTRACT

A method arranges, in a mobile communication network, data transmission between user equipment and at least one base station including a central unit and at least one remote unit associated therewith. The data includes information data and control data from the central unit to the remote unit, or vice versa. The method includes allocating radio resources for the data to/from the remote unit, grouping the allocated radio resources, each group including at least one radio resource allocated for data to/from a respective remote unit, including in each group data indicating an association of the allocated radio resource of that group with the respective remote unit, including in each group allocation data indicating the allocated radio resources, among the at least one allocated radio resource, that have been allocated for the information data, and transmitting the groups in the frequency-domain between the central unit and the at least one remote unit.

20 Claims, 3 Drawing Sheets

Figure 1A:
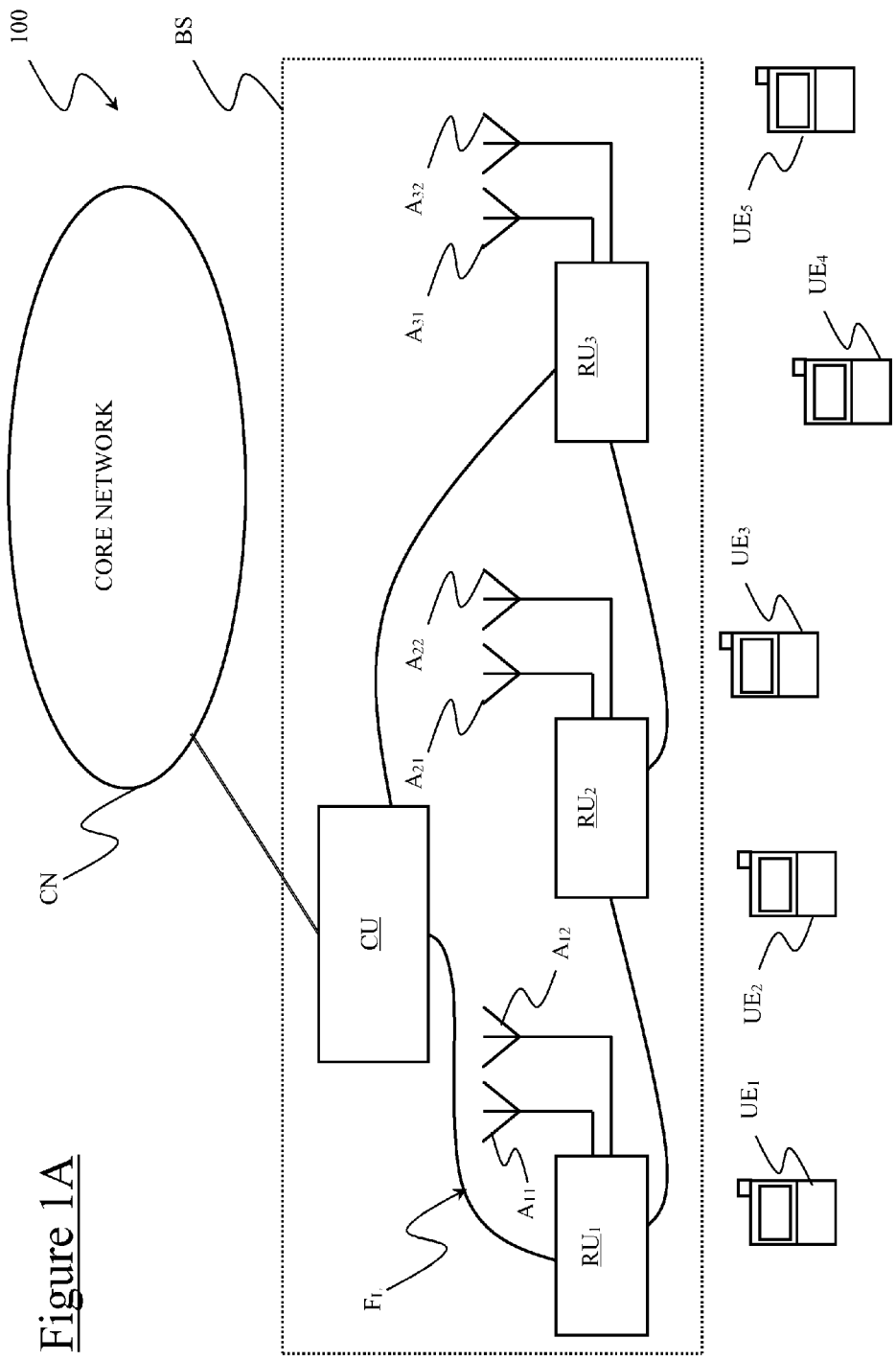

(51) Int. Cl.
*H04B 10/2575* (2013.01)
*H04W 88/08* (2009.01)

(56) References Cited

U.S. PATENT DOCUMENTS

| | | | | |
|---|---|---|---|---|
| 2013/0223377 A1* | 8/2013 | Doppler | ............... | H04L 1/04 370/329 |
| 2014/0003379 A1* | 1/2014 | Kang | ............... | H04L 5/0053 370/329 |
| 2014/0293944 A1* | 10/2014 | Kim | ............... | H04W 72/042 370/329 |
| 2016/0037550 A1* | 2/2016 | Barabell | ............ | H04B 17/318 455/450 |
| 2016/0112100 A1* | 4/2016 | Kang | ............... | H04B 7/061 370/329 |
| 2017/0150330 A1* | 5/2017 | Kim | ............... | H04W 4/08 |

OTHER PUBLICATIONS

Chanclou Philippe et al: "Optical fiber solution for mobile fronthaul to achieve cloud radio access network", 2013 Future Network & Mobile Summit, Authors, Jul. 3, 2013 (Jul. 3, 2013), pp. 1-11, XP032506948 [retrieved on Oct. 15, 2013].

* cited by examiner

METHOD FOR DYNAMICALLY REDUCING FRONTHAUL LOAD BETWEEN A BASE STATION AND MULTIPLE REMOTE RADIO UNITS

BACKGROUND OF THE INVENTION

Field of the Invention

The present invention generally relates to mobile communication networks—hereinafter, mobile networks. More specifically, the present invention relates to mobile networks based on a "Centralized Radio Access Network" (CRAN) architecture.

The work leading to the present invention has received funding from the European Union's Seventh Framework Program FP7/2007-2013 under grant agreement n. 317941—project iJOIN.

Overview of the Related Art

A CRAN typically comprises one or more central units each one connected to a plurality of remote units (preferably by means of respective optical fiber links).

According to a conventional CRAN architecture, in the downlink, the central unit receives data to be transmitted to user equipments of the mobile network, and provides a digital base-band signal. The digital base-band signal is then converted from electrical to optical, and transmitted to the remote units over optical fiber links. Each remote unit receives the optical base-band signal, which is then converted from optical to electrical, filtered, converted from digital to analog, up-converted from base-band to radio-frequency and amplified, before being radiated by antennas to the user equipments.

In radio access technologies based on OFDMA ("Orthogonal Frequency Division Multiple Access"), such as WiMAX ("Worldwide Interoperability for Microwave Access"), and LTE ("Long Term Evolution")/LTE-A ("LTE-Advanced"), the digital base-band signal is a composite digital base-band signal, namely it is composed of signals for different user equipment (or user signals) that are superimposed in the time domain.

Each conventional CRAN (based on optical fiber links) thus provides for transmission of one (optical) composite base-band signal (over the fiber links) for each (transmitting) antenna of each remote unit when downlink is considered, or of one (optical) composite base-band signal (over the fiber links) for each (receiving) antenna of each remote unit when uplink is considered, with such a transmission that takes place in the time-domain (e.g., according to "Open Base Station Architecture Initiative" (OBSAI) or "Common Public Radio Interface" (CPRI) standards. As a result of that, as the number of remote units connected to a given central unit increases, the available transmission capacity on the fiber links may rapidly become a bottleneck. Additionally, the available transmission capacity on the fiber links may also be saturated by a relatively low number of signals, especially when taking into account the growing data rate that the new radio access technologies impose—and that is expected to grow further with the forthcoming techniques such as "Multiple Input Multiple Output" (MIMO) and carrier aggregation techniques.

Some prior-art solutions have been addressed to such issues.

Signal processing algorithms have been proposed (such as "adaptive beamforming" and "network coordination" algorithms) that operate on each user signal separately.

WO2006/102919, "A radio Access Method, related base station, mobile radio-network and computer program product using an assignment scheme for antennas' sectors", discloses a system comprising a radio base station for a mobile network, and a set of remote units connected to the radio base station, preferably via a "Radio Over Fiber" (ROF) arrangement. Each remote unit provides radio coverage by means of a set of communication channels, and is equipped with a respective set of antenna elements. The communication channels are distributed over the antenna elements according to an assignment scheme that is dynamically variable.

WO2010/075864, "A Method for distributed Mobile Communications, corresponding system and computer program product", discloses a method of arranging exchange of signals between user terminals in a cellular communication system and at least one base station. The base station includes a central unit and a plurality of remote units. The signals are exchanged between the central unit and the remote units as aggregated signals for plural user equipments. The signals are processed at the remote units as distinct signals each associated to a respective one of the plural user equipments. Specifically, WO2010/075864 illustrates a method to reduce data over radio over fiber links (usually referred to as "fronthaul", in order to distinguish these links from "backhaul" links, which instead connect the central unit to the mobile transport network) based on frequency domain transmission. This is achieved by arranging IFFT/FFT modules in the remote units, and transmitting signals in the frequency-domain.

SUMMARY OF INVENTION

The Applicant has found that the above-cited solutions are not fully satisfactory for modern technological requirements.

Specifically, the Applicant has found that conventional CRAN architectures wherein signal processing operations are delegated to the central units are affected by flexibility issues, as any algorithm changes may involve software and/or hardware modifications in the central unit, as well as scalability issues, as involving a limitation on a maximum number of remote units that can be connected to a given central unit.

These issues are exacerbated in CRAN architectures relying on signal processing algorithms operating on each user signal separately (such as "adaptive beamforming" and "network coordination" algorithms), as application of such algorithms requires that signal processing operations are performed at a central unit side (wherein the user signals are still separately available), thus further burdening the central unit. The applicant thus believes that for effective application of such algorithms, data rate of the signals transmitted over the fiber links should be reduced.

The Applicant has found that, although frequency-domain transmission approach disclosed in WO2006/102919 and WO2010/075864 allows a relevant reduction of the data rate with respect to traditional time-domain based methods, data rate of the signals transmitted over the fiber links should be further reduced in order to meet modern requirements of increase of the maximum number of remote units that can be connected to a given central unit.

In view of the above, the Applicant has devised a solution aimed at overcoming these, as well as other, drawbacks. Specifically, the Applicant has devised a system and a method for dynamically reducing fronthaul load (comprising information and control data) by transmitting, in the frequency domain, only radio resources that have been allocated at least for information data.

One or more aspects of the solution according to embodiments of the invention are set out in the independent claims, with advantageous features of the same solution that are set forth in the dependent claims (whose wording is enclosed herein verbatim by reference).

More particularly, the solution according to embodiments of the present invention relates to a method of arranging, in a mobile communication network, transmission of data between user equipments and at least one base station comprising a central unit and at least one remote unit associated therewith. The data comprises information data and control data from the central unit to the at least one remote unit, or from the at least one remote unit to the central unit. The method comprises:

allocating radio resources for the data to/from the at least one remote unit, grouping the allocated radio resources into allocated radio resources groups each one comprising at least one radio resource allocated for data to/from a respective remote unit, including in each allocated radio resources group association data indicative of an association of the at least one allocated radio resource of that allocated radio resources group with the respective remote unit, including in each allocated radio resources group allocation data indicative of the allocated radio resources, among the at least one allocated radio resource, that have been allocated at least for the information data, and transmitting the allocated radio resources groups in the frequency-domain between the central unit and the at least one remote unit.

According to an embodiment of the present invention, the transmitting the allocated radio resources groups in the frequency-domain between the central unit and the at least one remote unit comprises transmitting, for each allocated radio resources group, only the allocated radio resources, among the at least one allocated radio resource of that allocated radio resources group, that have been allocated at least for the information data.

According to an embodiment of the present invention, the association data comprise a number of bits depending on a maximum number of remote units that can be associated with the central unit, each bit being associated with a respective remote unit and being set at a first logical value if the allocated radio resources of a considered allocated radio resources group are associated with that remote unit, or at a second logical value otherwise.

According to an embodiment of the present invention, the allocation data comprise a number of bits depending on a maximum number of radio resources available for allocation, each bit being associated with a respective radio resource and being set at the first logical value if the respective radio resource has been allocated at least for the information data, or at the second logical value otherwise.

According to an embodiment of the present invention, the allocation data further comprise at least one further bit associated with each radio resource, the at least one further bit providing an indication of a modulation scheme used for modulating the data on the allocated radio resources.

According to an embodiment of the present invention, the transmitting the allocated radio resources groups in the frequency-domain between the central unit and the at least one remote unit comprises transmitting each radio resources group sequentially.

According to an embodiment of the present invention, the transmitting the allocated radio resources groups in the frequency-domain between the central unit and the at least one remote unit comprises transmitting the association and allocation data of each radio resources group before the allocated radio resources of that radio resources group.

According to an embodiment of the present invention, the data are "Orthogonal Frequency Division Multiple" data.

According to an embodiment of the present invention, the grouping and the including are performed at central unit side when radio resources groups are transmitted from the central unit to the at least one remote unit, and at the at least one remote unit side when radio resources groups are transmitted from the at least one remote unit to the central unit.

Another aspect of the solution according to embodiments of the present invention relates to a system for exchanging data with user equipments in a mobile communication network. The system comprises a central unit adapted to be associated with at least one remote unit, and the data comprise information data and control data from the central unit to the at least one remote unit. The central unit is configured to:

allocate radio resources for the data to the at least one remote unit, group the allocated radio resources into allocated radio resources groups each one comprising at least one radio resource allocated for data to a respective remote unit, include in each allocated radio resources group association data indicative of an association of the at least one allocated radio resource of that allocated radio resources group with the respective remote unit, include in each allocated radio resources group allocation data indicative of the allocated radio resources, among the at least one allocated radio resource, that have been allocated at least for the information data, and transmit the allocated radio resources groups in the frequency-domain between the central unit and the at least one remote unit.

According to an embodiment of the present invention, the system further comprises the at least one remote unit.

According to an embodiment of the present invention, the at least one remote unit is connected to the central unit by means of optical fiber links.

According to an embodiment of the present invention, the at least one remote unit is connected to the central unit by means of wireless communication links.

A further aspect of the solution according to embodiments of the present invention relates to a computer program product for performing the method of above when the computer program product is run on a computer.

BRIEF DESCRIPTION OF THE ANNEXED DRAWINGS

Figure 1B:
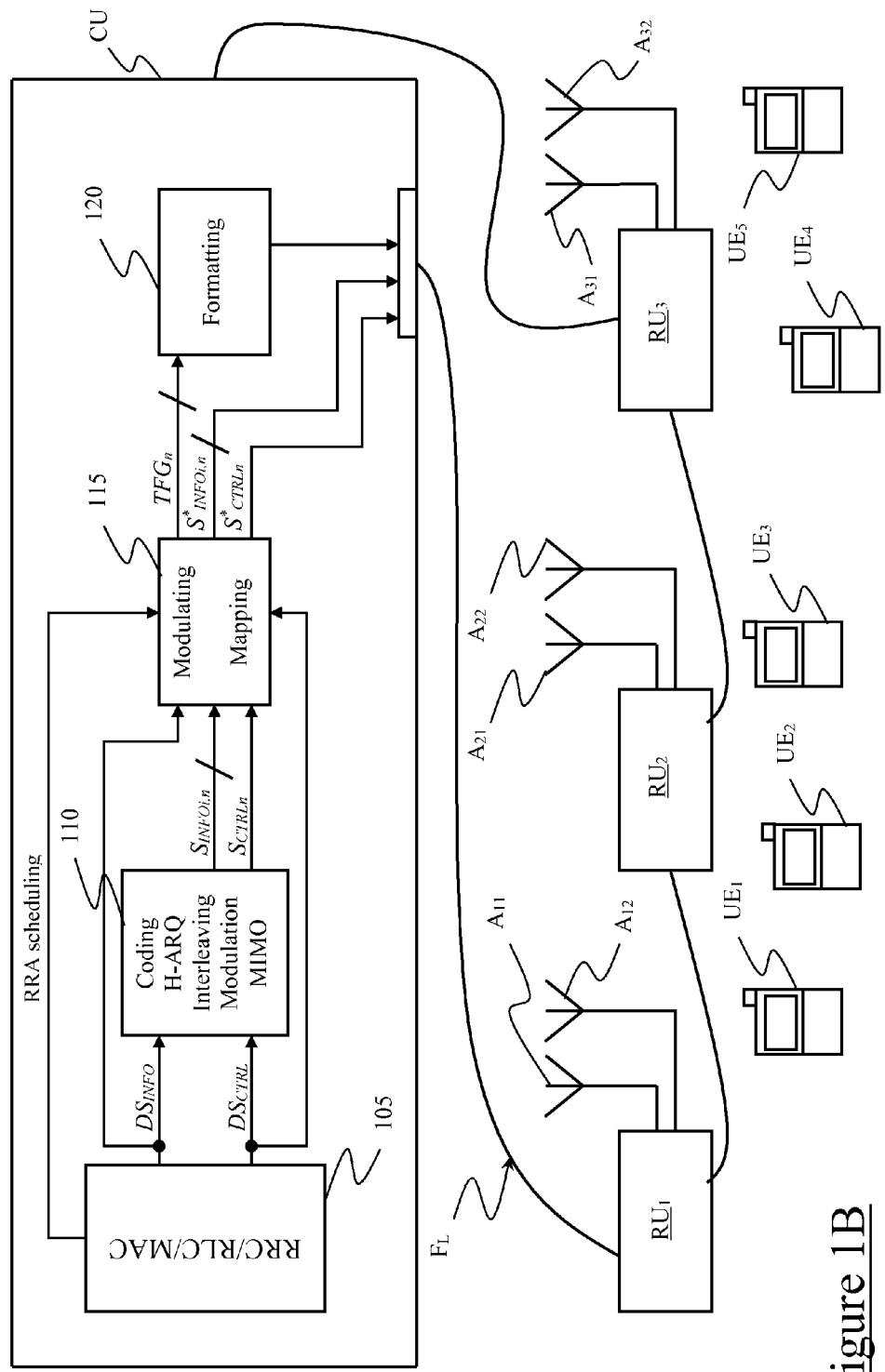
Figure 2:
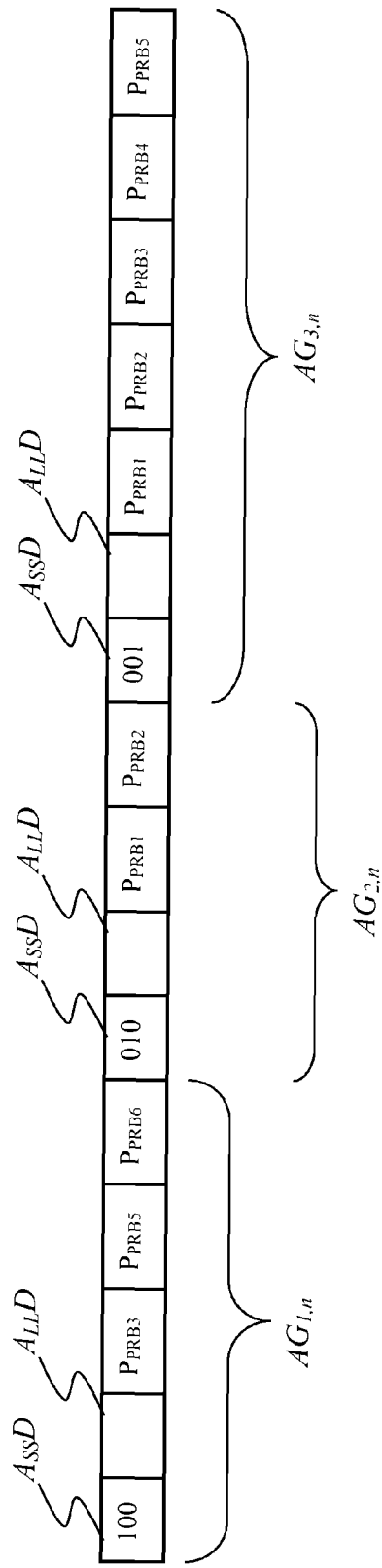

These and other features and advantages of the present invention will be made apparent by the following description of some exemplary and non limitative embodiments thereof. For its better intelligibility, the following description should be read making reference to the attached drawings, wherein:

FIGS. 1A-1B schematically show a mobile communication network, and a portion thereof, respectively, according to an embodiment of the present invention, and FIG. 2 is a schematic representation of exemplary allocated radio resources groups according to an embodiment of the present invention.

DETAILED DESCRIPTION OF PREFERRED EMBODIMENTS OF THE INVENTION

With reference to the drawings, FIGS. 1A-1B schematically show a mobile communication network (hereinafter, mobile network) 100, and a portion thereof, respectively, according to an embodiment of the present invention.

The mobile network 100 allows data to be transmitted between user equipment UE (i=1, 2, ..., I), such as the user equipment $UE_1$-$UE_5$ (I=5), and one or more base stations, such as the base station BS.

The mobile network 100 is for example compliant with the 3GPP LTE/LTE-Advanced or WiMAX standards. However, the principles of the present invention generally apply to any mobile network based on an OFDM ("Orthogonal Frequency Division Multiplexing") technique, and are particularly advantageous when applied to mobile networks further based on a MIMO ("Multiple Input Multiple Output") technique.

According to OFDM technique, data to be transmitted (including both information data and control data) are split into data sequences, the data sequences are modulated by separate and reciprocally orthogonal sub-carriers and multiplexed into a stream of data including OFDM symbols, or OFDM symbols stream, for transmission. According to MIMO technique, multiple OFDM symbols streams are transmitted/received via multiple transmitting/receiving antennas, which improves communication performance without additional bandwidth or increased transmission power.

As known, OFDM technique is based on radio resources allocation in time/frequency domain. Considering for example the 3GPP LTE/LTE-Advanced standard, in time domain radio resources are distributed every "Transmission Time Interval" (TTI), each one lasting 1 ms (sub-frame) and comprising two time slots of 0.5 ms, whereas in frequency domain the whole bandwidth is divided into a plurality of 180-kHz sub-channels (each one corresponding to 12 adjacent and equally spaced sub-carriers). A radio resource comprising a number of OFDM symbols (e.g., seven) spanning over one time slot in time domain and twelve adjacent sub-carriers in frequency domain is referred to as "Physical Resource Block" (PRB), and corresponds to the smallest radio resource that can be allocated to the i-th user equipment $UE_i$ for transmission.

According to the preferred, not limiting, illustrated embodiment, the mobile network 100 is based on "Centralized Radio Access Network" (CRAN) architecture/system, wherein each base station BS (or at least one of the base stations of the mobile network 100) comprises a central unit, such as the central unit CU, and one or more remote units $RU_j$ associated therewith (e.g., coupled or connected thereto)—j=1, 2, ..., J, with J=3 in the example at issue. As illustrated, the central unit CU is preferably connected, on one side, to the remote units $RU_j$, e.g. by means of a (e.g., ring) optical fiber link $F_L$ (also referred to as fronthaul link), and, on the other side, to a core network CN (e.g., by means of a proper wired or wireless link also referred to as backhaul link). Each remote unit $RU_j$ comprises a number K of transmitting/receiving antenna $A'_{j,k}$ (k=1, ..., K, with K=2 in the example at issue) for transmitting data from the central unit CU to plural user equipments $UE_i$ (and, hence, to plural remote units $RU_j$) and for transmitting data from plural user equipment $UE_i$ (and, hence, from plural remote units $RU_j$) to the central unit CU (hereinafter, such a bi-directional data transmission, i.e. downlink and uplink transmissions, will be also referred to as data transmission to/from plural user equipment $UE_i$ for the sake of conciseness).

In the following, in order to discuss a practical scenario, reference will be exemplarily made to a CRAN architecture wherein base-band functionalities are distributed between the central unit CU and the remote units $RU_j$. Such a CRAN architecture, thoroughly discussed in WO2010/075864, is now well-known in the art, thus only relevant aspects thereof strictly necessary to the understanding of the present invention will be introduced and described hereinafter (with some other aspects that, instead, will be intentionally omitted for the sake of conciseness).

Moreover, in the following description reference will be exemplarily made to downlink transmission only, it being understood that the present invention equivalently applies to uplink transmission as well.

As illustrated in FIG. 1B, the central unit CU comprises a control module 105 implementing higher layer protocols, such as "Radio Resource Control" (RRC), "Radio Link Control" (RLC) and "Medium Access Control" (MAC) layers, for receiving data for plural users equipment UE (e.g., through a conventional S1 interface), and for providing corresponding "Transport Blocks" comprising information $DS_{INFO}$ and control $DS_{CTRL}$ (such as pilot and synchronization) channels or data streams to plural user equipment $UE_i$.

The central unit CU also comprises a processing module 110 for receiving the information data streams $DS_{INFO}$ and providing, for each i-th user equipment $UE_i$, a number $N_S$ (e.g., $N_S \geq 1$ in the multi-antenna scenario herein considered) of information symbols streams $S_{INFO_{i,n}}$ (each n-th information symbol stream among the $N_S$ information symbol streams associated with the i-th user equipment $UE_i$ comprising a number of information symbols $s_{INFO_{i,n}}$), and for receiving the control data streams $DS_{CTRL}$ and providing $N_S$ corresponding control symbols streams $S_{CTRL_n}$ (each n-th control symbols stream among the $N_S$ control symbols streams comprising a number of control symbols $s_{CTRL_n}$).

In order to achieve that, the processing module 110 is preferably configured to perform encoding processing (e.g., comprising well-known "Cyclic Redundancy Code" insertion, segmentation, channel coding, rate matching—i.e., puncturing/repetition—operations), error correction processing (e.g., by means of "Hybrid Automatic Repeat Request" (H-ARQ) operations that manage retransmission at physical layer level by means of, for example, "Chase Combining" or "Incremental Redundancy" techniques), and interleaving, modulation and MIMO processing (e.g., based on "Spatial Multiplexing" or on "Space-Time/Frequency Coding") on the information data stream $DS_{INFO}$, and encoding interleaving, modulation and MIMO processing on the control data stream $DS_{CTRL}$ (indeed, H-ARQ operations are usually not required on the control data stream $DS_{CTRL}$, as the latter being generally transmitted by means of robust channel coding schemes).

The central unit CU also comprises a modulating/mapping module 115 configured to receive the information $S_{INFO_{i,n}}$ and control $S_{CTRL_n}$ symbols streams, and to modulate the information $S_{INFO_{i,n}}$ and control $S_{CTRL_n}$ symbols, thereby obtaining corresponding information $S^*_{INFO_{i,n}}$ and control $S^*_{CTRL_n}$ OFDM symbols (as well as corresponding information $S^*_{INFO_{i,n}}$ and control $S^*_{CTRL_n}$ OFDM symbols streams). The modulating is preferably carried out according to proper radio resources allocation scheduling functions, e.g. resident at the MAC layer—as conceptually shown in the figure by arrow connection, denoted by "RRA scheduling" wording, from the control module 105 to the modulating/mapping module 115.

Although not shown, the information $S^*_{INFO_{i,n}}$ and control $S^*_{CTRL_n}$ OFDM symbols streams are then subject to electrical-to-optical conversion, and transmitted to the remote units $RU_j$ over the optical fiber (fronthaul) link $F_L$—e.g., by means of standard transmission formats defined by international consortia such as CPRI ("Common Public Radio Interface") or OBSAI ("Open Base Station Architecture Initiative").

As visible in the figure, the modulating/mapping module 115 is also configured to receive the information $DS_{INFO}$ and control $DS_{CTRL}$ data streams, and, under the control of the radio resources allocation scheduling functions, to map them in Ns time-frequency radio resources grids $TFG_n$. Each n-th time-frequency radio resources grid $TFG_n$ contains the complete set of available PRBs, and identifies, among them, the allocated PRBs for the n-th information OFDM symbols streams $S^*_{INFO_{i,n}}$ of all the I user equipment $UE_i$ and for the n-th control OFDM symbols streams $S^*_{CTRL_n}$. Although not shown, mathematic relationships, formula or dynamic look-up tables defining the mapping are preferably provided by the central unit CU to the remote units $RU_j$ (e.g., for de-mapping operations) in the form of control information, e.g. refreshed at a refresh rate corresponding to a transmission frame or to a scheduling period.

Each n-th time-frequency radio resources grid $TFG_n$ is, conceptually, a matrix having a number R of rows equal to the number of radio resources (i.e., OFDM sub-carriers, in the example at issue) used for transmission and a number C of columns equal to the number of OFDM symbols in one frame period.

According to the present invention, the central unit CU comprises a formatting module 120 for properly formatting the PRBs actually contained in the n-th time-frequency grid $TFG_n$, as discussed herebelow.

Preliminarily, as should be understood, the term "module", especially in connection with the formatting module 120, is herein intended to contemplate either hardware or software implementation thereof. In the case of software implementation, operative steps may be implemented by proper code means included in a computer program, and performed when the program is run on a computer.

The formatting module 120 is configured to group the allocated PRBs into a number G of allocated PRBs groups $AG_{g,n}$ to be transmitted over the fiber link $F_L$ in the frequency-domain—$AG_{g,n}$ denoting the g-th allocated PRBs group, among the G allocated PRBs groups, associated with the n-th time-frequency grid $TFG_n$. As will be understood shortly, the number G of allocated PRBs groups $AG_{g,n}$ depends on an actual data load associated with the user equipment $UE_i$, as indicated in the n-th time-frequency grid $TFG_n$, and may vary according to the considered n-th time-frequency grid $TFG_n$. Thus, each g-th allocated PRBs group $AG_{g,n}$ comprises at least one PRB allocated for data to/from a respective remote unit $RU_j$.

Moreover, the formatting module 120 is configured to associate, to each g-th allocated PRBs group $AG_{g,n}$, association and allocation data. Broadly speaking, the association and allocation data are intended to allow rebuilding of the time-frequency radio resources grids $TFG_n$ (as better discussed below). Thus, as a result of the associating, each g-th allocated PRBs group $AG_{g,n}$ also comprises respective association and allocation data.

As should be readily understood, the formatting is performed (by the logical viewpoint) at central unit CU side when the allocated PRBs groups $AG_{g,n}$ are transmitted from the central unit CU to the remote units $RU_j$, and at remote units $RU_j$ side when the allocated PRBs groups $AG_{g,n}$ are transmitted from the remote units $RU_j$ to the central unit CU.

With joint reference to FIG. 2, schematically illustrating G=3 exemplary allocated PRBs groups $AG_{g,n}$ of a generic n-th time-frequency grid $TFG_n$ (again, for the scenario illustrated in FIGS. 1A-1B of one central unit CU and three remote units $RU_1$-$RU_3$), each g-th allocated PRBs group $AG_{g,n}$ comprises:

allocated PRBs pairs $P_{PRBp}$ (p=1, 2, ..., P, wherein P depends on channel bandwidth) allocated to a respective user equipment $UE_i$ (and, hence, to a respective remote unit $RU_j$), as indicated in the n-th time-frequency grid $TFG_n$). By way of example only, P=6 allocated PRBs pairs $P_{PRBp}$ are herein considered. As visible from the example in the figure, the allocated PRBs of the first allocated PRBs group $AG_{g,n}$ (i.e., the allocated PRBs group $AG_{1,n}$) comprise the allocated PRBs pairs $P_{PRB3}$, $P_{PRB5}$, $P_{PRB6}$, the allocated PRBs of the second allocated PRBs group $AG_{g,n}$ (i.e., the allocated PRBs group $AG_{2,n}$) comprise the allocated PRBs pairs $P_{PRB1}$, $P_{PRB2}$, and the allocated PRBs of the third allocated PRBs group $AG_{g,n}$ (i.e., the allocated PRBs group $AG_{3,n}$) comprise the allocated PRBs pairs $P_{PRB1}$, $P_{PRB2}$, $P_{PRB3}$, $P_{PRB4}$, $P_{PRB5}$.

association data $A_{SS}D$ indicative of an association of the allocated PRBs (i.e., the allocated PRBs pairs $P_{PRBp}$ in the considered example) of that allocated PRBs group $AG_{g,n}$ with the respective remote unit $RU_j$ (and, hence, with the respective user equipment $UE_i$). According to the illustrated embodiment, the association data $A_{SS}D$ are in the form of a bitmap whose number of bits depends on a maximum number of remote units $RU_j$ that can be associated with the central unit CU. Preferably, each j-th bit is associated with a respective j-th remote unit $RU_j$, and is set either at a first logical value (e.g., a high, or "1" logical value) if the allocated PRBs pairs $P_{PRBp}$ of a considered g-th allocated PRBs group $AG_{g,n}$ are associated with that j-th remote unit $RU_j$, or at a second logical value (e.g., a low, or "0" logical value) otherwise. Thus, in the considered example of three remote units $RU_j$, the association data $A_{SS}D$ of the first allocation PRBs group $AG_{1,n}$ comprise the bitmap "100" identifying, for example, the remote unit $RU_1$, the association data $A_{SS}D$ of the second allocation PRBs group $AG_{2,n}$ comprise the bitmap "010" identifying, for example, the remote unit $RU_2$, and the association data $A_{SS}D$ of the third allocation PRBs group $AG_{3,n}$ comprise the bitmap "001" identifying, for example, the remote unit $RU_3$. Thus, in the considered example, only the allocated PRB pairs $P_{PRB3}$, $P_{PRB5}$, $P_{PRB6}$ are transmitted to the remote unit $RU_1$, only the allocated PRB pairs $P_{PRB1}$, $P_{PRB2}$ are transmitted to the remote unit $RU_2$, and only the allocated PRB pairs $P_{PRB1}$, $P_{PRB2}$, $P_{PRB3}$, $P_{PRB4}$, $P_{PRB5}$ are transmitted to the remote unit $RU_3$.

allocation data $A_{LL}D$ indicative of the allocated PRBs (i.e., the allocated PRBs pairs $P_{PRBp}$ in the considered example), among the allocated PRBs pairs of a considered allocated PRBs group $AG_{g,n}$ that have been allocated at least for the information data. According to an embodiment of the present invention, as illustrated in the figure, the allocation data $A_{LL}D$ are in the form of a bitmap whose number of bits depends on a maximum number of allocated PRBs pairs available for transmission in a given sub-frame. Each bit may be associated with a respective allocated PRBs pairs $P_{PRBp}$, and is set either at the high (or low) logical value if the respective PRBs pair $P_{PRBp}$ has been allocated at least for the information data (i.e., for both control and information data, or for information data only, hereinafter referred to as information allocated PRBs pair $P_{PRBp}$), or at the low (or high) logical value otherwise (hereinafter referred to as control allocated PRBs pair $P_{PRBp}$, namely an allocated PRB pair $P_{PRBp}$ that only carries control data, such as pilot and synchronization data). According to a different embodiment of the present invention, not shown, the allocation data $A_{LL}D$ further comprise at least one further bit associated with each allocated PRBs pair $P_{PRBp}$, the at least one further bit providing an indication of a modulation scheme (e.g., QPSK, 16-QAM, 64-QAM) used for modulating the data on the radio resources. According to such an embodiment, the allocation data $A_{LL}D$ may be in the form of a bitmap whose number of bit pairs depends on (e.g., it is equal to) the maximum number of available allocated PRBs pairs $P_{PRBp}$, with each bits pair associated with a respective allocated PRBs pair $P_{PRBp}$. By way of example only, the bit pair "00" may indicate a control allocated PRB pair $P_{PRBp}$, the bits pair "01" may indicate an information allocated PRBs pair $P_{PRBp}$ and QPSK modulation scheme, the bits pair "10" may indicate an information allocated PRBs pair $P_{PRBp}$ and 16-QAM modulation scheme, and the bits pair "11" may indicate an information allocated PRBs pairs $P_{PRBp}$ with 64-QAM modulation scheme.

After the formatting, the resulting allocated PRBs groups $AG_{g,n}$ are then subject to electrical-to-optical conversion (not shown) and transmitted to the remote units $RU_j$ over the (fronthaul) optical fiber link $F_L$.

As should be readily understood, in the exemplary considered scenario wherein the fronthaul link is implemented by means of a ring optical fiber link, provision and transmission of the association $A_{SS}D$ and allocation $A_{LL}D$ together with the respective allocated PRBs groups $AG_{g,n}$ allows providing dynamical routing towards the remote units $RU_j$, thus drastically decreasing fronthaul load. Moreover, thanks to the association $A_{SS}D$ and allocation $A_{LL}D$ data transmitted with (e.g., before) the PRB pairs $P_{PRBp}$ both statistical multiplexing of the data to/from plural remote units $RU_j$ is enabled (namely, if a remote unit $RU_j$ has less load, the capacity can be allocated dynamically to other remote units $RU_j$ connected to the same fronthaul link) and re-mapping the received PRB pairs $P_{PRBp}$ for rebuilding the right time-frequency grid $TFG_n$ at the remote units $RU_j$ side is possible.

Thus, with respect to the known solutions (and, especially the solution disclosed in WO2010/075864) wherein the $N_S$ time-frequency grids $TFG_n$ are transmitted in the frequency domain column by column, even when empty, or almost empty (namely when only the control data have to be transmitted in case of low load periods of time), the present invention allows transmitting the allocated PRB pairs $P_{PRBp}$ only within the time-frequency grid $TFG_n$, thus making the fronthaul load proportional to the effective load to be transmitted to the users equipment $UE_i$.

It is worth noting that the method proposed in this invention does not compress the data to be transmitted over the optical fiber link $F_L$, hence ensuring at remote units $RU_j$ side a same "Quality of Service" (QoS) as that experienced at the central unit CU side.

Moreover, additional bits provided by the association $A_{SS}D$ and allocation $A_{LL}D$ data do not significantly affect data throughput (and, however, it is largely compensated by the saving of transmission capacity). Indeed, considering for example that the maximum number of remote units $RU_j$ that can be connected to a central unit CU is equal to 128 (i.e., the association data is a 128 bit bitmap) signaling burden would be equal to 128 kbps (i.e., 128 bits every 1 ms sub-frame), which is negligible. Similarly, considering for example that the allocation data is a N-bits bitmap (being N the number of allocated PRBs pairs contained in a subframe), the corresponding signaling burden would be equal to N kbps (i.e. N bits every 1 ms sub-frame), which is still negligible.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the mobile network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to mobile network based on the LTE standard, it should be understood that it is not in the intentions of the Applicant to be limited to the implementation of any particular mobile network architecture or protocol. Considering for example an evolution of the LTE/LTE-A standard, currently under discussion, providing carriers with narrowband control data streams, it is possible to foresee complete "switch-off" of the control allocated PRBs pairs. In this way, according to the exemplary protocol defined above, no fronthauling transmission capacity will be necessary for the transmission of the control allocated PRBs pairs.

Moreover, although in the present description explicit reference to optical fiber links has been made, this should not be construed as limiting. Indeed, the principles of the present invention may be also applied to scenarios wherein the fronthauling link is managed by means of wireless links instead of the optical fiber link.

Finally, the method could be easily applied also to systems different than OFDMA based ones. By way of example only, in case of systems based on a CDMA ("Code Division Multiple Access") technique, such as the 3GPP UMTS/HSDPA system, the principles of the present invention described above may be applied with simple modifications. For example, a skilled person, in the light of the teachings of the present invention, may operate so as to execute spreading and scrambling operations in the remote units, thereby making it possible to transmit the different user signals in the fronthaul link as separate signals. This would allow transmitting only the signals of the users that are actually allocated for transmission, with the clear advantage that the transmission rate on the fronthaul link would become proportional to the actual load on the radio interface. In turn, this would allow performing statistical multiplexing/load balancing among the remote units connected to the same fronthaul network.

The invention claimed is:

1. A method of arranging, in a mobile communication network, transmission of data between user equipment and at least one base station comprising a central unit and a plurality of remote units associated with the central unit, the method comprising:
   allocating, for each respective remote unit of the plurality of remote units, one or more radio resources for data to/from the respective remote unit, wherein the data comprises information data and control data from the central unit to the respective remote unit, or from the respective remote unit to the central unit,
   grouping, for each respective remote unit, the one or more allocated radio resources into an allocated radio resources group, the allocated radio resources group comprising at least one radio resource allocated for the data to/from the respective remote unit,
   including, in the allocated radio resources group for each respective remote unit, association data indicative of an association of the at least one allocated radio resource of the allocated radio resources group with the respective remote unit,
   including, in the allocated radio resources group for each respective remote unit, allocation data indicative of the one or more allocated radio resources that have been allocated at least for the information data, and
   transmitting, for each respective remote unit, the allocated radio resources group in a frequency-domain between the central unit and the respective remote unit.

2. The method according to claim 1, wherein the transmitting the allocated radio resources group in the frequency-domain between the central unit and the respective remote unit comprises transmitting, for each allocated radio resources group, only allocated radio resources, among the one or more allocated radio resources of that allocated radio resources group, that have been allocated for the information data.

3. The method according to claim 1, wherein the association data comprises a number of bits depending on a maximum number of remote units that can be associated with the central unit, each bit being associated with a respective remote unit and being set at a first logical value if the one or more allocated radio resources of a considered allocated radio resources group are associated with that remote unit, or at a second logical value otherwise.

4. The method according to claim 3, wherein the allocation data comprises a number of bits depending on a maximum number of radio resources available for allocation, each bit being associated with a respective radio resource and being set at the first logical value if the respective radio resource has been allocated at least for the information data, or at the second logical value otherwise.

5. The method according to claim 4, wherein the allocation data further comprises at least one further bit associated with each radio resource, the at least one further bit providing an indication of a modulation scheme used for modulating the data on the one or more allocated radio resources.

6. The method according to claim 1, wherein the transmitting, for each respective remote unit, the allocated radio resources group in the frequency-domain between the central unit and the respective remote unit comprises transmitting each radio resources group sequentially.

7. The method according to claim 1, wherein the transmitting the allocated radio resources group in the frequency-domain between the central unit and the respective remote unit comprises transmitting the association and allocation data of each radio resources group before the one or more allocated radio resources of that radio resources group.

8. The method according to claim 1, wherein the data is "Orthogonal Frequency Division Multiple" data.

9. The method according to claim 1, wherein the grouping, the including the association data, and the including the allocation data are performed at a central unit side when radio resources groups are transmitted from the central unit to the respective remote unit, and at an at least one remote unit side when radio resources groups are transmitted from the respective remote unit to the central unit.

10. A system for exchanging data with user equipment in a mobile communication network, the system comprising a central unit adapted to be associated with a plurality of remote units, the central unit being configured to:
    allocate, for each respective remote unit of the plurality of remote units, one or more radio resources for data to the respective remote unit, wherein the data comprises information data and control data from the central unit to the respective remote unit,
    group, for each respective remote unit, the one or more allocated radio resources into an allocated radio resources group, the allocated radio resources group comprising at least one radio resource allocated for the data to the respective remote unit,
    include, in the allocated radio resources group for each respective remote unit, association data indicative of an association of the at least one allocated radio resource of the allocated radio resources group with the respective remote unit,
    include, in the allocated radio resources group for each respective remote unit, allocation data indicative of the one or more allocated radio resources that have been allocated at least for the information data, and
    transmit, for each respective remote unit, the allocated radio resources group in a frequency-domain between the central unit and the respective remote unit.

11. The system according to claim 10, further comprising one or more remote units of the plurality of remote units.

12. The system according to claim 11, wherein the one or more remote units is connected to the central unit by optical fiber links.

13. The system according to claim 11, wherein the one or more remote units is connected to the central unit by wireless communication links.

14. A non-transitory computer readable medium including software code portions stored therein that, when executed by at least one computer, cause the at least one computer to:
    allocate, for each respective remote unit of a plurality of remote units, one or more radio resources for data to/from the respective remote unit, wherein the data comprises information data and control data from a central unit to the respective remote unit, or from the respective remote unit to the central unit,
    group, for each respective remote unit, the one or more allocated radio resources into an allocated radio resources group, the allocated radio resources group comprising at least one radio resource allocated for the data to/from the respective remote unit, include, in the allocated radio resources group for each respective remote unit, association data indicative of an association of the at least one allocated radio resource of the allocated radio resources group with the respective remote unit, include, in the allocated radio resources group for each respective remote unit, allocation data indicative of the one or more allocated radio resources that have been allocated at least for the information data, and transmit, for each respective remote unit, the allocated radio resources group in a frequency-domain between the central unit and the respective remote unit.

15. The non-transitory computer readable medium according to claim 14, wherein the transmitting the allocated radio resources group in the frequency-domain between the central unit and the respective remote unit comprises transmitting, for each allocated radio resources group, only allocated radio resources, among the one or more allocated radio resources of that allocated radio resources group, that have been allocated for the information data.

16. The non-transitory computer readable medium according to claim 14, wherein the association data comprises a number of bits depending on a maximum number of remote units that can be associated with the central unit, each bit being associated with a respective remote unit and being set at a first logical value if the one or more allocated radio resources of a considered allocated radio resources group are associated with that remote unit, or at a second logical value otherwise.

17. The non-transitory computer readable medium according to claim 16, wherein the allocation data comprises a number of bits depending on a maximum number of radio resources available for allocation, each bit being associated with a respective radio resource and being set at the first logical value if the respective radio resource has been allocated at least for the information data, or at the second logical value otherwise.

18. The non-transitory computer readable medium according to claim 17, wherein the allocation data further comprises at least one further bit associated with each radio resource, the at least one further bit providing an indication of a modulation scheme used for modulating the data on the one or more allocated radio resources.

19. The non-transitory computer readable medium according to claim 14, wherein the transmitting, for each respective remote unit, the allocated radio resources group in the frequency-domain between the central unit and the respective remote unit comprises transmitting each radio resources group sequentially.

20. The non-transitory computer readable medium according to claim 14, wherein the transmitting the allocated radio resources group in the frequency-domain between the central unit and the respective remote unit comprises transmitting the association and allocation data of each radio resources group before the one or more allocated radio resources of that radio resources group.

* * * * *